Sept. 3, 1963 P. C. WHARFF, JR 3,102,414
CARPET WEAR TESTER
Filed Aug. 3, 1960 5 Sheets-Sheet 1
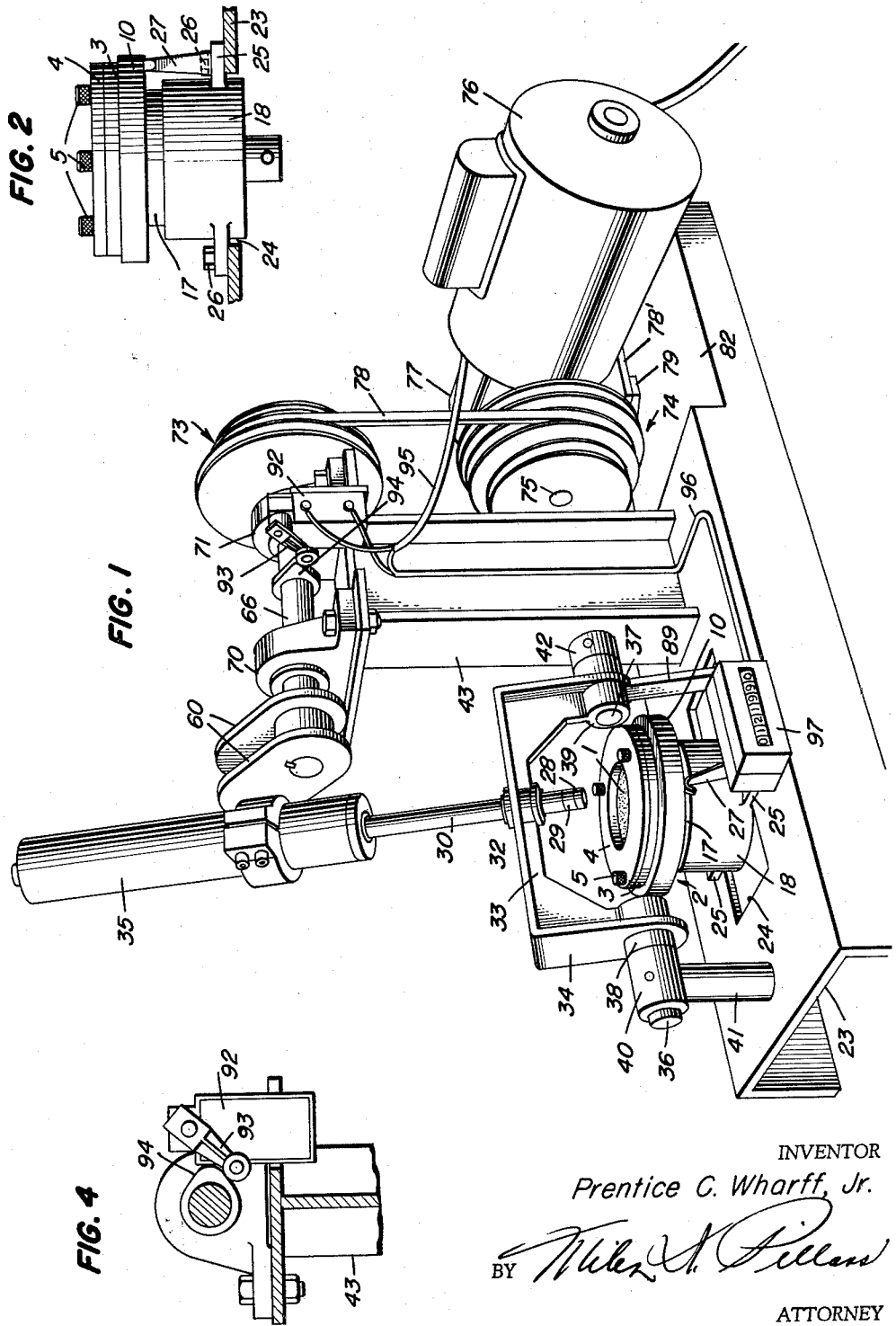
INVENTOR
Prentice C. Wharff, Jr.
BY
ATTORNEY Sept. 3, 1963　　　　P. C. WHARFF, JR　　　　3,102,414
CARPET WEAR TESTER
Filed Aug. 3, 1960　　　　　　　　　　　5 Sheets-Sheet 2
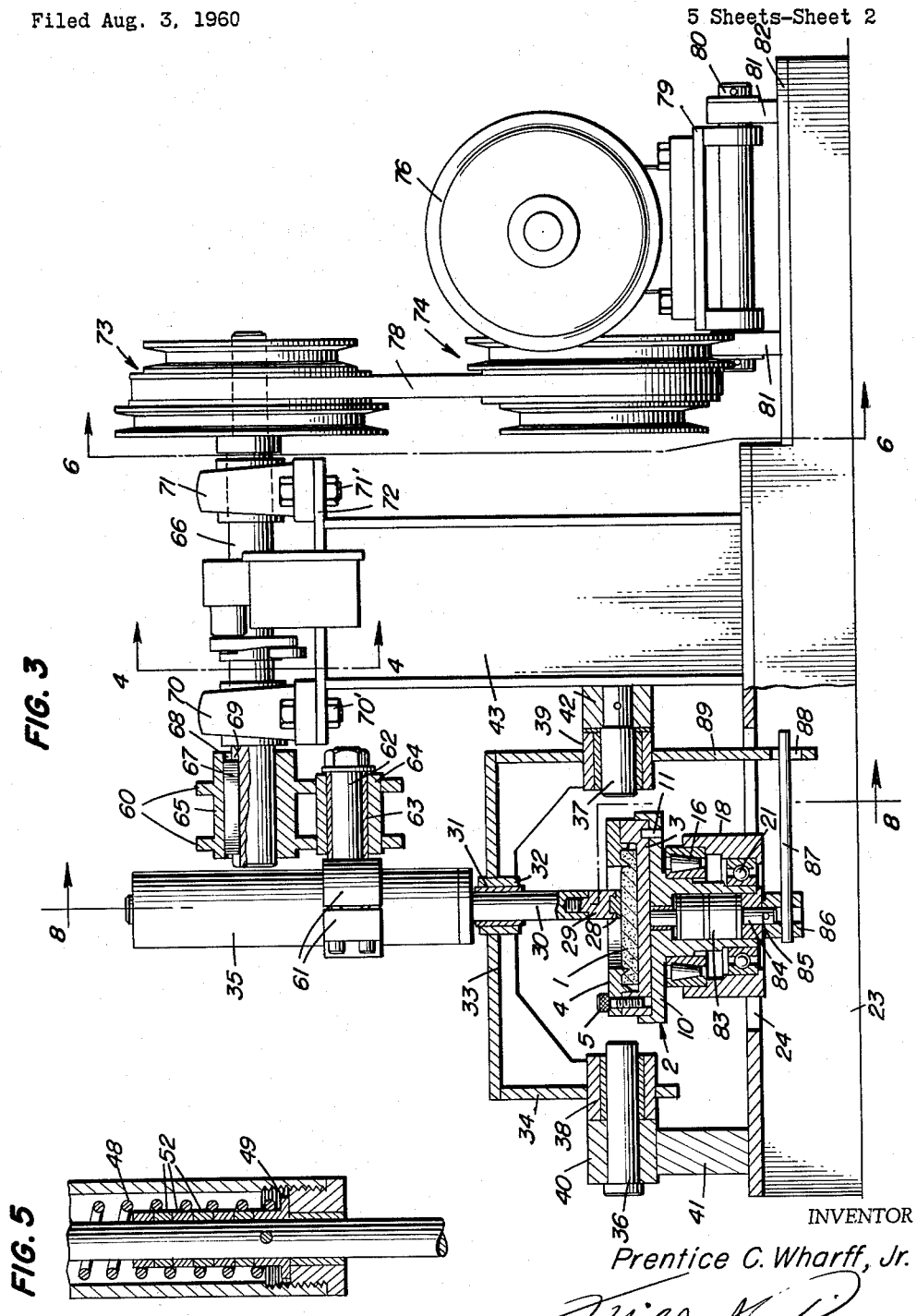
INVENTOR
Prentice C. Wharff, Jr.
BY
ATTORNEY

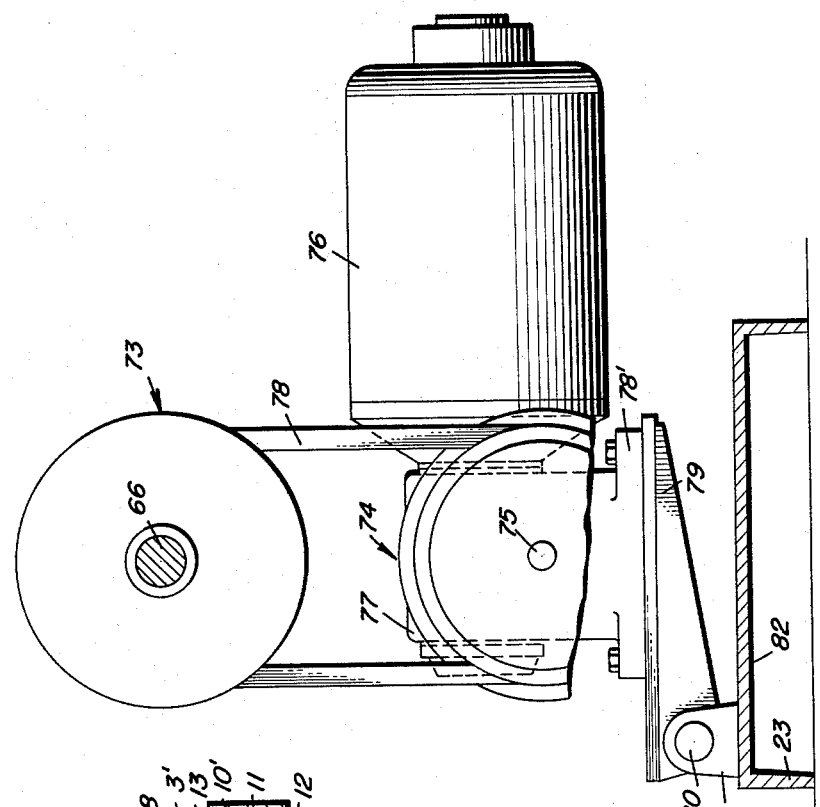
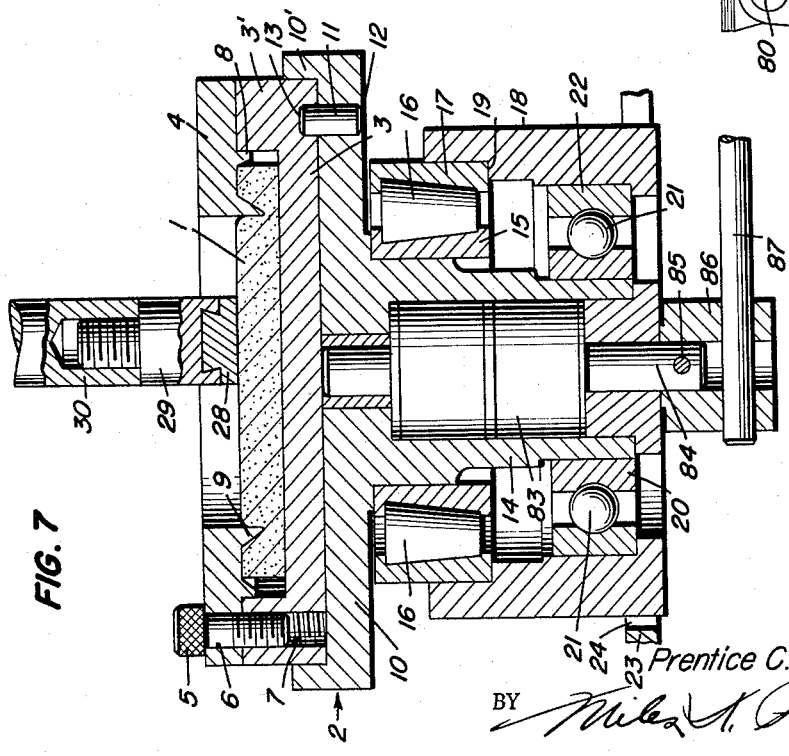

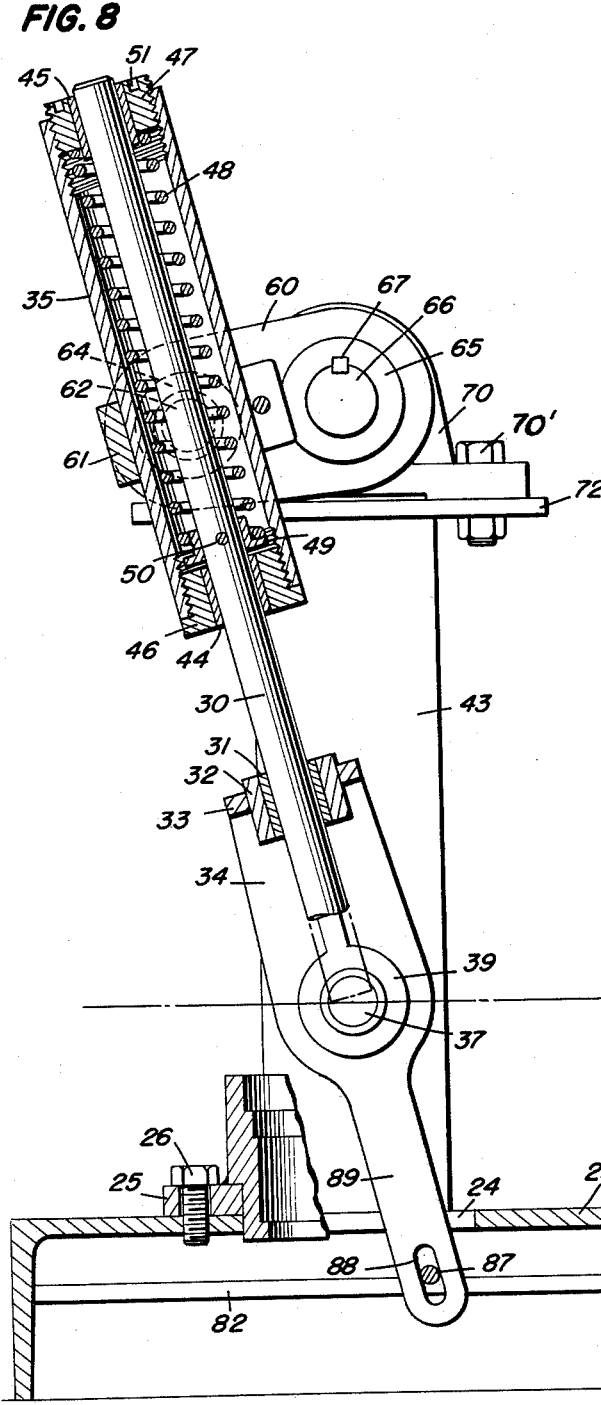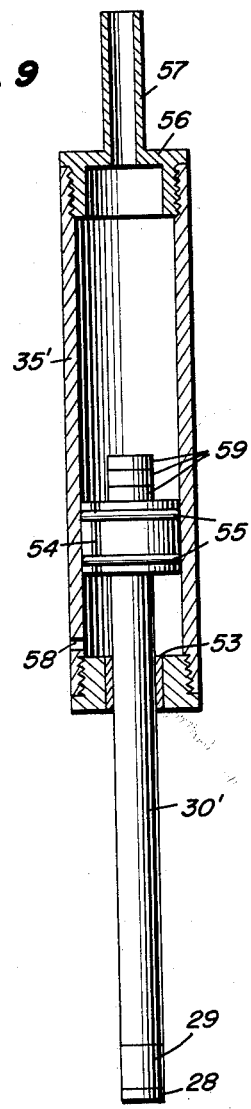

Sept. 3, 1963
P. C. WHARFF, JR
3,102,414
CARPET WEAR TESTER

Filed Aug. 3, 1960
5 Sheets-Sheet 5

INVENTOR
Prentice C. Wharff, Jr.

ATTORNEY

> United States Patent Office 3,102,414
Patented Sept. 3, 1963

3,102,414
CARPET WEAR TESTER
Prentice C. Wharff, Jr., Lafayette, Calif., assignor to The Dow Chemical Company, Midland, Mich., a corporation of Delaware
Filed Aug. 3, 1960, Ser. No. 47,164
8 Claims. (Cl. 73—7)

This invention relates to wear testing devices and is particularly directed to an improved apparatus for accurately testing the wear on material such as rugs and carpets.

In order accurately to determine the wear qualities and life expectancy of carpet and rug materials, it is necessary to subject the material repetitively to conditions which closely approximate actual use of such materials. A close study of the loading of carpet surfaces by normal walking thereon made by high-speed cameras has revealed two pronounced and interesting characteristics. One of these is that there is normally no relative sliding motion between the carpet surface and a person's foot under usual walking conditions and, secondly, the load is usually applied at an acute angle of attack increasing from zero load to a maximum at a substantially vertical pressure to the surface of the rug and then continuing past the perpendicular to the rug surface to an acute angle of departure, during which latter period the pressure progressively decreases from maximum to zero. These characteristics of normal carpet wear have generally not been approximated in conventional wear testing machines, as in most instances such machines test the carpet for abrasion, and there is substantially no abrasion in normal walking on a carpet. The above characteristics indicate that in order correctly to test the wear and life expectancy of a carpet, the load should be applied at a substantially predetermined acute angle, pass through the vertical to the surface, and continue to another predetermined acute angle, while the load increases from the initial contact with the carpet to a maximum and then progressively decreases to zero at the point of departure. This generates a reversal of variation in both direction and magnitude of compressive and bending stresses in the carpet pile.

In accordance with the present invention, the wear testing device is designed to apply a pressure to a sample of carpet material at a predetermined acute angle of attack, increase the pressure from zero when initially contacting the surface of the sample to an adjustable predetermined maximum pressure perpendicular to the surface of the test sample, and progressively change the angle of the load to another predetermined acute angle past the vertical from the angle of attack, during which latter loading the pressure decreases from maximum to zero at the time that the load is removed from the sample. This type of loading may be repeated a predetermined number of times on a given piece of material and the weight of the material before the test and after the test will indicate the wear which has occurred.

Preferably, the testing device includes an arrangement for intermittently advancing the material so that a different part of the material is presented to the wear loading element for each loading cycle. A very practical method for thus moving the test sample is to mount it upon a rotatable table, which is held stationary during the loading cycle and is turned through a predetermined angle during the return stroke of the loading mechanism while the loading mechanism is out of contact with the surface of the sample. In this manner, the same area may be cyclically subjected to the same load test and will also be given a rest period between repetitive loadings, so as more nearly to approximate actual carpet use.

In addition, if desired, the load may be applied to the test sample through different loading elements which may vary in size, so as more nearly to approximate the different wear to which a carpet pile is subjected by different sizes of feet and particularly heel surfaces. In addition, it is desirable that the testing device should have an arrangement for varying the maximum pressure to which the sample is subjected during each loading cycle and to be able to vary the actual deflection to which the pile is subjected during each test cycle; that is, the actual penetration or total compressive movement in terms of the maximum deflection to which the pile is subjected measured in terms of movement from its normal undeflected surface position to its deflection under maximum vertical pressure thereon. In accordance with the present invention, all of these features are adjustably provided and can be predetermined so that comparative results of tests on different sample materials can readily be made.

A testing device made in accordance with the present invention preferably includes an intermittently rotatable table for supporting a test sample and a rocking, reciprocating loading plunger which is adapted to engage a test sample on the table while the table is stationary and to subject the sample to a pressure which gradually varies from zero to a predetermined maximum and back to zero during each engagement with the surface of the test sample. This plunger initially engages the test sample at a variable predetermined acute angle of attack at zero pressure and progressively varies the angle of application of pressure on the sample from the initial angle of attack past the perpendicular to the sample at substantially maximum pressure to a variable predetermined acute angle of departure at zero pressure and is then returned to the initial sample engaging position while raised out of contact with the sample. During this return movement of the plunger, the table is rotated through a predetermined angle to present a new area of material to the action of the plunger. Any suitable mechanism for obtaining this type of action may be utilized, and a preferred embodiment of such a device is illustrated in the drawings, together with modifications of certain details which may be found more desirable for testing various types of materials.

An object of this invention is to provide an improved wear testing device.

Another object of this invention is to provide a carpet wear testing device which closely simulates actual carpet wear in use.

A further object of this invention is to provide an improved carpet wear tester which can be adjustably loaded for variable maximum loadings.

Still another object of the present invention is to provide an improved carpet wear testing device having a variable predetermined penetration or maximum amount of compressive travel and having predetermined angles of attack and departure of the carpet engaging member with the carpet.

Further objects and advantages of this invention will become apparent from the following description referring to the accompanying drawings, and the features of novelty which characterize this invention will be pointed out with particularity in the claims appended to and forming a part of this specification.

In the drawings:

FIG. 1 is a perspective view of an improved wear testing device embodying the present invention particularly adapted for testing the wear or life characteristics of carpet and rug materials;

FIG. 2 is a side elevational view of the test specimen supporting table illustrating its mounting on the base of the device which is partly broken away and showing the resilient drag spring or brake for holding the table stationary during engagement of a test specimen by a loading member;

FIG. 3 is a side elevational view of the carpet wear testing device illustrated in FIG. 1;

FIG. 4 is a sectional view taken along line 4—4 of FIG. 3 illustrating the counter mechanism;

FIG. 5 is a fragmentary sectional view of a portion of the loading device illustrating one manner for adjusting the inertial loading of the device;

FIG. 6 is a sectional view taken along line 6—6 of FIG. 3 and partly broken away to illustrate the motor mounting and drive for the testing device;

FIG. 7 is an enlarged sectional view illustrating details of the test specimen supporting table and loading device;

FIG. 8 is an enlarged sectional view taken along line 8—8 of FIG. 3 illustrating details of the loading device and its adjustable loading features with details of the mechanism for driving the test specimen supporting table;

FIG. 9 is a longitudinal sectional view through a modified form of the loading device shown in FIGS. 1, 3, 5, and 8.

Figure 10:
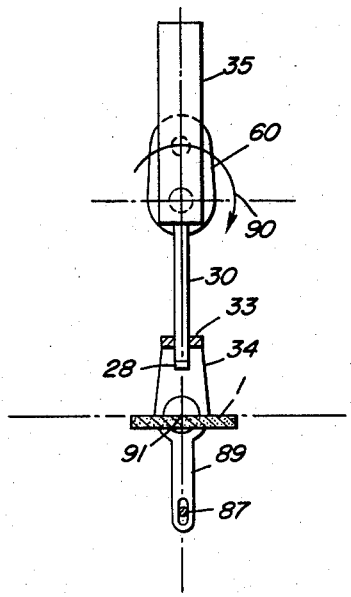
FIGS. 10, 11, 12, and 13 illustrate various positions of the loading device during a cycle of operation.

Referring to the drawings, a wear testing device particularly adaptable for testing the wearing characteristics of rug and carpet materials is illustrated which embodies the principles for closely simulating the wear to which rugs and carpets actually are subjected during normal usage. In most instances, rugs and carpets on floors are held stationary and the pile thereof is subjected to compressive and bending stresses when walked upon in a normal fashion. In accordance with the present invention, a sample test specimen of rug or carpet material 1 is cut to a suitable size for retention on a supporting table 2. In the illustrated construction, the table 2 comprises a material supporting plate 3 which is substantially circular and on which the test specimen of material 1 is adapted to be firmly clamped against relative rotation by a retaining ring 4. This ring is secured to the plate 3 in any suitable manner, as by a plurality of substantially equally spaced bolts 5 which extend through openings 6 in the retaining ring 4 and threadedly engage corresponding openings 7 around the periphery of the plate 3. Preferably, the retaining ring 4 is formed with an annular axially extending flange 8 having an outer diameter substantially equal to the inner diameter of an upstanding annular flange 3' on the plate 3, so that the flange 8 on the ring 4 is adapted to fit snugly within the plate flange 3' and forms a guide which centers the ring 4 on the plate 3. Preferably, a second axially extending annular flange 9 is formed along the inner periphery of the retaining ring 4 and, as is best seen in FIG. 7, clamps the test specimen 1 securely in position on the plate 3 by extending or biting into the pile of the test specimen. If desired, the flange 9 on the retaining ring may be of a discontinuous configuration and present spaced or connected teeth which more effectively bite into and grip the test specimen. Such a construction not only assures the secure retention of a test specimen on the supporting table, but also assures that each sample of material tested will have been held in the same manner and that the same size sample will have been exposed to the test loading and stressing procedures, thus assuring a basis for comparing the wear on different materials according to selected test conditions.

In this manner, a series of test specimens may be prepared in advance for testing them under the same conditions; that is, under the same loading pressure for substantially the same periods of time at the same rates of operation of the testing device and under substantially the same ambient conditions.

In order to facilitate the quick mounting and dismounting of the test specimen supporting plate 3, the table is formed with a base 10 having an annular flange 10' extending axially from one side thereof along the outer periphery and having an inner diameter substantially equal to the outer diameter of the plate 3 so that the plate 3 can be snugly seated on the base 10 within the flange 10'. A locating pin 11 is securely press-fitted into an opening 12 in the base 10 and projects outwardly from the surface of the plate 10 spaced inwardly from the annular flange 10'. The plate 3 is adapted to be held against rotation when seated on the base 10 by fitting a socket 13, in the side thereof away from the flange 3', over the projecting end of the pin 11. In this manner, the plate 3 always is definitely located on the base 10 in driving engagement therewith through the pin 11.

The table base 10 is formed with a supporting hub 14, which extends axially from the side of the base 10 opposite the annular flange 10'. This hub 14 is securely supported against radial movement and tilting by a pair of anti-friction bearings. The weight of the supporting table and the thrust imposed thereon during tests are transmitted through base 10 to an inner race 15 of a tapered roller bearing comprising rollers 16 mounted between the inner race 15 and an outer bearing race 17. A supporting frame 18 is formed with a bearing supporting shoulder 19 on which the outer bearing race 17 rests. In order to assure against tilting of the supporting table during tests, it is desirable that the table should be supported by a pair of axially spaced bearings. This is conveniently obtained by arranging a set of ball bearings having an inner race 20 mounted on the lower portion of the hub 14 and having a plurality of conventional bearing balls 21 arranged between the inner bearing race 20 and an outer bearing race 22 mounted in the frame 18 spaced axially from the roller bearing supporting shoulder 19.

The table mounting frame 18 can be supported in any suitable manner and is preferably mounted on a channel frame 23, which forms the main base for the wear testing device. In the illustrated arrangement, the table mounting frame 18 is supported in an opening 24, which extends longitudinally of the base portion of the channel frame 23. A pair of lugs 25 is welded or otherwise suitably secured to the mounting frame 18 at substantially diametrically opposite points thereof, and each lug is secured to the base of the channel frame 23 in any suitable manner, as by bolts 26, which extend through elongated slots in the lugs 25 and threadedly engage openings in the base of the channel frame member 23.

The test specimen supporting table is resiliently held against rotation by a slip brake of any suitable type, which may comprise a simple leaf spring 27. This spring is arranged in frictional engagement with the underside of the table base 10 and conveniently stressed and held in this position by being clamped by one of the mounting bolts 26, as is more clearly shown in FIG. 2.

The desired loading of the test specimen 1 during tests is obtained by subjecting the exposed area of the specimen 1 to compressive and bending stresses applied thereto at predetermined angles under predetermined adjustable depths of penetration and at predetermined rates of operation. In addition, the mechanism is provided with an arrangement for preselecting the inertial loading to be applied to a specimen, as well as preselecting the maximum compressive stress to which it is to be subjected. This type of action is obtained through a stressing foot 28, of any suitable material and size, replaceably secured by a base 29 threadedly mounted on the end of a rocking reciprocating plunger 30. This type of test foot provides for varying the weight, and therefore the inertia, as well as the type of surface of the member which engages and stresses the test specimen. It also provides for varying the surface which is engaged during a test, so as more nearly to simulate the wear qualities of materials when the areas which are stressed are relatively large, as well as when the material is subjected to concentrated forces on relatively small areas, as by spike heels.

The angles of attack and departure of the stressing foot 28 on the test specimen 1 and the degree of penetration of the pile of the test specimen by the foot 28 may be preselected, and the penetration varied by the mounting of the plunger 30 on its operating mechanism. This mounting is provided by slidably supporting the plunger 30 in a journal bearing 31 mounted in a bearing housing 32 supported in the cross member 33 of a rocker frame 34 and operably slidably mounting the end of the plunger 30 away from the foot 28 in an operating cylinder 35. The rocker frame 34 is oscillatably mounted on shafts 36 and 37, which respectively extend through hubs 38 and 39 secured to the two legs of the rocker frame 34. The shaft 36 is supported in a journal bearing mounted in a trunnion 40 secured to a post 41 mounted on the web of the channel frame 23 which forms the main base of the device. The other rocker frame supporting shaft 37 is mounted in a bearing supported in a trunnion 42 which is secured to an I-beam post 43, also rigidly mounted on the web of the channel frame 23. This provides a very rigid support for the pivot shafts 36 and 37 of the rocker frame 34 and assures a positive directional guiding of the operating end of the plunger 30.

The wear of rug and carpet materials depends in part upon the maximum pressure exerted on the carpet as it is walked upon, and this, of course, varies greatly with the mode in which the person walks, as well as the weight of the person. Usually, when a person walks rapidly, a greater impact is imposed on a carpet than when walking more slowly. Furthermore, not only the maximum pressure to which the carpet is subjected varies with the mode of walking and weight of the individual, but the actual manner in which the strain is applied to the carpet pile varies with the mode in which the person walks and the weight of the person. These latter very materially affect the inertial loading or strain to which the carpet is subjected and affect the bending stresses developed in the carpet pile. The compressive stresses are mainly affected by the maximum weight applied to the carpet. In order to simulate all of these forces which affect the normal wear of a carpet, the present invention utilizes an arrangement for adjusting the maximum pressure to which the carpet is subjected during each engagement with the plunger foot 28 and also for adjustably varying the inertial loading of the carpet engaging foot 28.

As is more clearly seen in FIG. 8, in one embodiment of the mounting of the plunger 30 in the operating cylinder 35, the plunger is slidably guided and supported in the cylinder 35 by axially spaced journal bearings 44 and 45, which are supported in bearing housings 46 and 47, respectively. These housings are mounted in opposite ends by the operating cylinder 35 in any suitable manner, as by threaded engagement therewith, and provide for the rigid guided support of the plunger 30 in the cylinder 35.

The loading on the engaging foot 28 is determined by the maximum pressure applied to the foot by the plunger 30 when the plunger is substantially perpendicular to the surface of a test specimen. This pressure may be applied to the plunger 30 in any suitable manner. FIG. 8 illustrates a resilient compression coil spring 48 arranged within the cylinder 35 and held in compression therein between a spring seat formed by the inner surface of the bearing housing 47 and a spring seat 49 arranged around the plunger 30 and secured thereto in any suitable manner, as by a pin 50. The compressive force of the spring 48 transmitted to the plunger 30 through the spring seat 49 and the pin 50 may be adjusted by adjusting the relative axial position in the operating cylinder 35 of the spring seat formed by the bearing housing 47. This adjustment of the compression of the spring 48 may conveniently be made by applying a suitable wrench to sockets 51 in the outer end of the bearing housing 47. This construction provides an adjustable resilient spring loading mounting for controllably and resiliently loading the plunger foot whereby pressures of the foot on a specimen can be varied at will. These pressures, of course, cyclically vary from zero to the maximum determined by the compressive force of the spring 48 on the plunger 30 and are reduced to zero when the plunger foot 28 becomes disengaged from the rug surface. The adjustable spring loading not only controls the maximum pressure exerted by the plunger foot 28 on the rug, but also controls to a certain extent the rate of change of strain in the rug pile for any given speed of operation of the testing device as this strain varies from zero to the maximum pressure and back to zero during a fixed interval of time.

In order to vary the inertial loading of the plunger foot 28 on a test specimen, the mass of the force transmitting member comprising the foot 28 and its attachment to the plunger 30 may be varied by the addition or removal of weighting rings 52, loosely mounted on the plunger 30 between the spring seat 49 and the outer bearing 45. Such inertial loading can easily be varied simply by unscrewing the bearing housing 47 and adding or removing rings 52 and then replacing the bearing housing and adjusting it to a position to provide the desired maximum pressure to be applied to a test specimen by the resilient compressive force of the spring 48, as has been previously explained. This inertial loading also contributes to the control of the rate of change of the loading from zero to maximum stress on the test sample.

The adjustable resilient loading of the plunger foot 28 also can be provided in the form of an air pressure cushion which applies its compressive force to a plunger 30' during the portion of the operating cycle when the plunger foot 28 is in engagement with a test specimen. FIG. 9 illustrates an embodiment which can be utilized for applying this type of adjustable resilient loading to the plunger foot. In this construction, the plunger 30' is guidably mounted in an operating cylinder 35' by being supported therein by a journal bearing 53 and by being provided with a piston 54 which slidably engages the inner periphery of the cylinder 35'. This piston 54 preferably is provided with one or more piston sealing rings 55, which may be of the O-ring type, mounted in grooves extending circumferentially around the piston 54, so that the rings 55 provide a good sliding sealing engagement with the inner surface of the cylinder 35'.

The variable resilient loading of the plunger 30' is provided by closing the end of the cylinder 35' with a suitable cylinder head, which may conveniently be in the form of a cap 56 which threadedly engages and closes the end of the cylinder 35' opposite the bearing 53. This cap 56 preferably is formed with an air hose connecting tube 57, which may be formed integrally with the cap 56 and may be connected through any suitable flexible air hose to a source of air pressure. Any suitable valve may be arranged to control the air pressure applied to the cylinder 35', and, therefore, on the piston 54, so that the pressure may be varied as desired for controlling the loading of the plunger 30'. As in the spring-loaded construction shown in FIG. 8, pressure exerted on a test specimen by the plunger foot 28 will vary from zero as the foot initially engages the test specimen to a maximum as determined by the air pressure within the cylinder 35' exerted on the piston 54. Since the air within the cylinder 35' between the cylinder head formed by the cap 56 and the piston 54 is compressible, this provides a resilient cushioned loading of the plunger 30' as it engages a test specimen. In order to assure that the resilient loading on the plunger 30' is controlled by the pressure within the cylinder 35' applied to the piston from the source of compressed air, the cylinder 35' is formed with one or more vent openings 58 adjacent to the end of the cylinder 35' away from the cylinder head formed by the cap 56. This provides for the free ingress and egress of air from the cylinder 35' between the piston 54 and the end of the cylinder away from the source of compressed air, so that the pressure for loading the plunger 30' through the piston 54 is determined solely by the pressure of the compressed air.

The inertial loading of the plunger foot 28 may be varied in any suitable manner by changing the mass of the plunger. As shown in FIG. 9, this may be done by adding or removing suitable weights 59 secured to the plunger in any suitable manner, as by threaded engagement with the end of the piston 54. These weights can easily be added and removed from the piston 54 by unscrewing the cylinder cap 56 from the cylinder 35' and moving the plunger 30' to the outer end of the cylinder 35', thus making the end of the piston 54 readily accessible for adding or removing weights 59. In this manner, both the resilient maximum loading of the plunger foot 28 on the plunger 30' and its inertial loading can be very easily adjusted.

Operation of the illustrated wear testing devices is provided through a mechanism which cyclically exerts a pressure on the plunger 30 tending to make it reciprocate toward and away from the test specimen table 2, while simultaneously rocking the plunger 30 relative to a contact point on the specimen mounting table. This operation is obtained through a rotatable drive crank mechanism comprising a pair of crank arms 60 which are drivingly secured to the operating cylinder 35 through an adjustable connection. This connection comprises a split clamping ring 61 which securely grips the cylinder 35 and is adjustable longitudinally thereof in order to adjust the maximum penetration of the plunger foot 28 into the pile of a test specimen. This adjustable mounting of the cylinder 35 in the clamping ring 61 also can be utilized to adjust the resilient loading on the plunger 30. Movement of the cylinder 35 toward the rocker frame 34 can be used to increase the compression of the biasing spring 48 at the point of maximum pressure of the plunger on a test specimen. Reverse movement of the cylinder 35 can be used to decrease the maximum pressure of the plunger foot 28 on a test specimen and to decrease its penetration.

The clamping rang 61 is drivingly connected to the crank arms 60 through a stub shaft 62 supported in a journal bearing 63 mounted in a hub 64 connecting together the outer ends of the crank arms 60. The crank arms 60 are rigidly mounted on a hub 65 which is provided with a driving connection to a counter-shaft 66 formed in any suitable manner, as by a key 67 engaging a keyway 68 in the hub 65 and a keyway 69 in the shaft 66. The countershaft 66 is rotatably supported by suitable bearings mounted in bearing housings 70 and 71 supported on a pedestal platform 72 and secured thereto in any suitable manner, as by bolts 70' and 71'. The desired relative rigidity of the various operating parts of the wear testing device is further assured by rigidly mounting the pedestal platform 72 on the I-beam post 43, as by welding it thereto. In this manner, the support of the cylinder operating mechanism, the support for the rocker frame 34, and the support for the test specimen mounting table 2, all provide a rigid structure with the main channel frame base 23.

Power is supplied to the countershaft 66 at predetermined variable speeds through suitable adjustable drive means which, in the illustrated embodiment, comprise complementary stepped pulleys 73 and 74, drivingly mounted respectively on the countershaft 66 and on a gearbox output shaft 75. The output shaft 75 is supplied with power from any suitable source which may include an electric motor 76 which is drivingly connected to the shaft 75 through suitable reduction gearing in a gearbox 77. As is more clearly shown in FIG. 6, power is transmitted from the stepped pulley 74 to the stepped pulley 73 through a suitable belt 78, such as a V-belt. The belt 78 is conveniently held under the desired driving tension by mounting the motor 76, gearbox 77, and the stepped pulley 74 on a pedestal 78' secured to a platform 79, which is pivotally mounted on a shaft 80. This shaft is rotatably supported in bearings formed in bosses 81 which are rigidly mounted on a platform 82 extending between and rigidly secured to the sides of the channel frame 23. In this manner, the weight of the motor, gearbox, and stepped pulley pivots into the loop of the belt 78 about the axis of the shaft 80 so as to maintain driving tension on the belt.

In order successively to present a different area of a test specimen to engagement with the foot 28, the specimen mounting table 2 is adapted to be moved during each portion of the operating cycle while the plunger foot 28 is raised out of contact with a test specimen. This movement of the specimen mounting table 2 preferably is such as to cyclically return a given test specimen engagement area to the engagement position, so that the same area may be repetitively engaged, with a rest period occurring between engagements with the plunger foot 28. Such movement of the table is conveniently obtained by rotating the table through a predetermined angle of advance after each engagement of a test specimen with the plunger foot 28.

In the illustrated embodiment of this invention, the step-by-step advance of the test specimen mounting table is conveniently obtained by driving the table through a one way clutch mechanism. This clutch mechanism comprises a one way drive clutch 83 which is mounted in the hub 14 of the table base 10 and is provided with a clutch drive shaft 84 drivingly connected in any suitable manner, as by a pin 85 extending through the shaft 84 and drivingly connected to a coupling 86. This coupling is rigidly connected to a drive bar 87 which extends into a slot 88 in an arm 89 formed as an integral extension of one side of the rocker frame 34.

Figure 11:
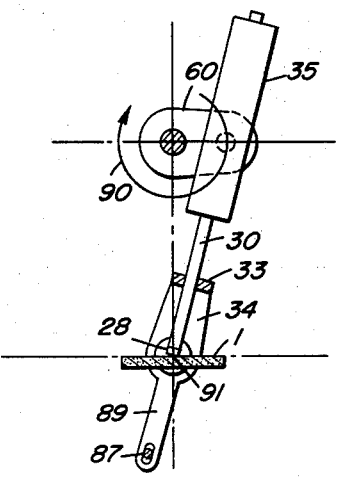
Figure 12:
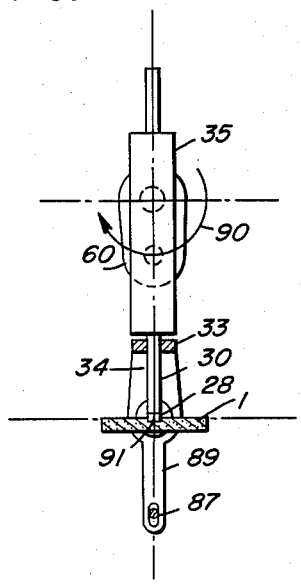

The combined adjustable loading drive of the plunger foot 28 which provides for reciprocation of the plunger with a simultaneous rocking thereof to simulate normal walking on the surface of a carpet with the periodic movement of the test specimen mounting table during the disengaged portion of the plunger foot with the test specimen is more clearly illustrated with reference to FIGS. 10–13. As shown in these figures, when the crank arms 60 are raised so that the operating cylinder 35 is in its uppermost position, the plunger 30 also is moved the farthest away from a test specimen 1 and the device is adapted to be driven in the direction indicated by the arrow 90, so that the crank arms 60 move in a clockwise direction as seen in FIGS. 10–13. In moving from the position shown in FIG. 10 to the position shown in FIG. 11, the operating cylinder 35 is moved to the right and downwardly, so that the plunger 30 exerts a turning movement on the rocker frame 34 which oscillates the frame 34 and the plunger 30 about a specimen engagement point 91 which is substantially along the axis of the rocker frame shafts 36 and 37. When the crank arms 60 have moved susbtantially 90° from their dead center position, shown in FIG. 10, to the position shown in FIG. 11, the plunger 30 will have moved to a position at which the plunger foot 28 engages a test specimen 1 at a predetermined acute angle of attack. Further drive of the crank arms 60 in a clockwise direction, from the position shown in FIG. 11 to the position shown in FIG. 12 causes a rocking of the plunger 30 from its initial angle of attack to a position substantially perpendicular to the test specimen 1. This movement of the crank arms 60 carries the operating cylinder 35 to its maximum downward position, thereby exerting maximum compressive strain on the test specimen 1 by the plunger 30. Continued drive by the crank arms 60 in a clockwise direction from the position shown in FIG. 12 to the position shown in FIG. 13 causes the plunger 30 to continue to rock about the point of engagement 91 past the vertical position to another predetermined acute angle, at which time the plunger foot becomes disengaged from the test specimen 1. In the part of the operating cycle illustrated in FIGS. 11, 12, and 13 from the initial engagement of the plunger foot with a test specimen as shown in FIG. 11 to the maximum strain position shown in FIG. 12 and continued to the departure position shown in FIG. 13, the carpet material is subjected to a reversal of bending stress and to compression which varies from zero to a maximum and back to zero, while the bending stress undergoes a reversal of direction from the position shown in FIG. 11 to the position shown in FIG. 13.

Figure 13:
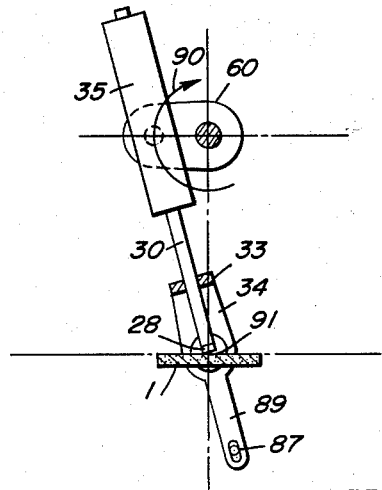

The plunger is returned to its initial engagement position, FIG. 11, from its departure position, FIG. 13, by continued rotation of the crank arms 60, as indicated by the arrow 90. Such continued rotation raises the operating cylinder 35 from the position shown in FIG. 13 to the position shown in FIG. 10, which raises the plunger 30 away from the test specimen 1 and rocks the plunger 30 and the rocker frame 34 in a clockwise direction, as seen in FIGS. 13, 10, and 11. This rocking of the frame 34 produces a corresponding rocking of the arm 89, which transmits its rocking motion into an oscillatory movement of the end of the drive bar 87 and through it to the one way clutch 83. The clutch 83 is constructed and arranged so as to drive the test specimen mounting table 2 during the oscillatory drive of the bar 87 from the position shown in FIG. 13, which corresponds to the point of disengagement or departure of the plunger foot 28 from the test specimen, to the position shown in FIG. 11, which corresponds to the initial point of engagement of the plunger foot 28 with the test specimen. Thus, the clutch is arranged to drive or advance the specimen mounting table through a predetermined angle, as determined by the oscillation of the drive bar 87, during the portion of the operating cycle while the plunger foot is raised out of contact with the test specimen 1 and is being returned to its initial specimen engaging position. During the portion of the cycle while the plunger foot is in engagement with the test specimen 1, the drive bar 87 is oscillated in a reverse direction from that part of the cycle during which the plunger is raised, and, when oscillated in this opposite direction, the one way drive clutch 83 is adapted to release its driving connection between the shaft 84 and the mounting table base 10, so that the braking spring 27 frictionally holds the specimen table 2 stationary.

The number of cycles of operation, that is, the number of times a test specimen is stressed by the plunger foot, is automatically counted in any suitable manner. In the illustrated embodiment this includes a microswitch 92 mounted on the pedestal platform 72 and having an operating finger 93 arranged to be actuated once each revolution of the shaft 66 by a cam 94 drivingly mounted on the shaft 66. The microswitch is connected through conductors 95 to a source of electric power and through conductors 96 to an electric register 97 mounted on the frame 23, so that the cycles of operation can quickly and easily be read from the front of the testing device.

While a particular embodiment of a wear testing device and variations of certain parts have been illustrated and described, modifications thereof will occur to those skilled in the art. It is to be understood, therefore, that this invention is not to be limited to the particular details described, and it is intended in the appended claims to cover all modifications within the spirit and scope of this invention.

What is claimed is:

1. A wear testing device comprising a table for supporting a test specimen, a stressing foot, and means for actuating said stressing foot to positions repetitively engaging a specimen on said table over a predetermined contact point area and exerting a progressively varying pressure on said contact point area of the specimen from zero to a predetermined maximum and back to zero during each engagement of said contact point area and initially engaging said area of the specimen at a predetermined acute angle of attack at zero pressure and for rocking said stressing foot in engagement with the specimen by progressively varying the angle of application of pressure on said area of the specimen from said initial acute angle of attack past the perpendicular to the specimen at substantially said maximum pressure to a predetermined acute angle of departure therefrom at zero pressure and returning said stressing foot raised out of contact with the specimen to the initial specimen contact point area engaging position.

2. A wear testing device comprising a table for supporting a test specimen, means for repetitively engaging a specimen on said table over a predetermined contact point area, means for progressively varying pressure of said specimen engaging means on the specimen from zero to an adjustable predeterminable maximum and back to zero during each engagement of said contact point area and providing for initially engaging said area of the specimen by said engaging means at a predeterminable acute angle of attack at zero pressure and for rocking said specimen engaging means by progressively varying the angle of application of pressure on said area of the specimen from said initial acute angle of attack past the perpendicular to the specimen at substantially said maximum pressure to a predeterminable acute angle of departure therefrom at zero pressure and for returning said specimen engaging means raised out of contact with the specimen to the initial specimen contact point area engaging position, and means for controllably loading said engaging means for controlling the pressures exerted thereby on a test specimen.

3. A wear testing device comprising a table for supporting a test specimen, means for repetitively engaging an area of a specimen on said table and for exerting a progressively varying pressure on said area of the specimen from zero to an adjustable predetermined maximum and back to zero during each engagement and initially engaging the specimen at a predetermined acute angle of attack at zero pressure and progressively varying the angle of application of pressure on the specimen from said initial acute angle of attack past the perpendicular to the specimen at substantially said maximum pressure to a predetermined acute angle of departure therefrom at zero pressure and returning said means raised out of contact with the specimen to the initial specimen engaging position, and means for progressively intermittently moving said table whereby different parts of the specimen are presented for successive engagements thereof.

4. A wear testing device comprising a movably mounted table for supporting a test specimen, means for repetitively engaging a specimen on said table and for exerting a progressively varying pressure on an area of the specimen from zero to an adjustable predetermined maximum and back to zero during each engagement and initially engaging the specimen at a predetermined acute angle of attack at zero pressure and progressively varying the angle of application of pressure on said area of the specimen from said initial acute angle of attack past the perpendicular to the specimen at substantially said maximum pressure to a predetermined acute angle of departure therefrom at zero pressure and returning said means raised out of contact with the specimen to the initial specimen engaging position, means for moving said table while said engaging means is raised out of contact with the specimen to present a different part of the specimen for successive engagements thereof, and means for adjusting the loading of said engaging means for controlling the pressures exerted thereby on a test specimen.

5. A wear testing device comprising a movable table for supporting a test specimen, means for engaging and exerting pressure on a specimen on said table, means for controllably loading said engaging means for controlling the pressures on a specimen, means for repetitively operating said engaging means and progressively varying the pressure thereof on a specimen from zero to a predetermined maximum and back to zero during each operation while simultaneously initially moving said engaging means into engagement with an area of a specimen at an acute angle of attack at zero pressure and progressively varying the angle of application of pressure on said area of the specimen from said initial acute angle of attack past the perpendicular to the specimen at said maximum pressure to an acute angle of departure therefrom at zero pressure and returning said engaging means raised out of contact with the specimen to the initial specimen engaging position, and means for moving said table while said engaging means is raised out of contact with a specimen and is being returned to said initial position whereby a different part of the specimen is presented for successive engagements.

6. A wear testing device comprising an indexibly movable table for supporting a test specimen, means including a foot for engaging and exerting pressure on a specimen on said table, said latter means including a plunger for mounting and operating said foot, means for controllably variably resiliently loading said plunger for controlling the pressures of said foot on a specimen, means for repetitively operating said plunger and progressively varying the pressure of said foot on a specimen from zero to a predeterminable maximum and back to zero during each operation while simultaneously initially moving said foot into engagement with a specimen at a predeterminable acute angle of attack at zero pressure and progressively varying the angle of application of pressure by said foot on the specimen from said initial acute angle of attack past the perpendicular to the specimen at said maximum pressure to a predeterminable acute angle of departure therefrom at zero pressure and returning said foot raised out of contact with the specimen to the initial specimen engaging position, and means including a one-way drive for moving said table while said foot is raised out of contact with the specimen and is being returned to said initial position whereby a different part of a specimen is presented for successive engagements by said foot and disengaging said drive while said foot is in engagement with a specimen.

7. A wear testing device comprising an indexibly movable table for supporting a test specimen, means including a foot for engaging and exerting pressure on a specimen on said table, means for controllably loading said foot for controlling the pressures of said foot on a specimen, means for repetitively operating said foot and progressively varying the pressure thereof on a specimen from zero to a predeterminable maximum and back to zero during each operation while simultaneously initially moving said foot into engagement with a specimen at a predeterminable acute angle of attack at zero pressure and progressively varying the angle of application of pressure by said foot on the specimen from said initial acute angle of attack past the perpendicular to the specimen at said maximum pressure to a predeterminable acute angle of departure therefrom at zero pressure and returning said foot raised out of contact with the specimen to the initial specimen engaging position, and means including a one-way drive for moving said table while said foot is raised out of contact with the specimen and is being returned to said initial position whereby a different part of a specimen is presented for successive engagements by said foot and disengaging said drive while said foot is in engagement with a specimen.

8. A wear testing device comprising an indexibly rotatable table for supporting a test specimen, means including a foot for engaging and exerting pressure on a specimen on said table, said latter means including a plunger for mounting and operating said foot, means comprising a cylinder having an adjustable resilient spring loading mounting for said plunger therein for controlling the pressures of said foot on a specimen, means comprising a pivotal mounting for said cylinder having an axis substantially in the plane of said table and a rotatable crank drive pivotally secured to said cylinder at a position adjustable longitudinally of said cylinder with means on said cylinder pivotal mounting for guiding said plunger axially of said cylinder for repetitively operating said plunger whereby the pressure of said foot on a specimen progressively varies from zero to an adjustable predetermined maximum and back to zero during each operation while simultaneously initially moving said foot into engagement with a specimen at a predetermined acute angle of attack at zero pressure and progressively varying the angle of application of pressure by said foot on the specimen from said initial acute angle of attack past the perpendicular to the specimen at said maximum pressure to a predetermined acute angle of departure therefrom at zero pressure and returning said foot raised out of contact with the specimen to the initial specimen engaging position, and means comprising a one-way indexing drive for rotating said table while said foot is raised out of contact with a specimen and is being returned to said initial position whereby a different part of the specimen is presented for successive engagements by said foot and disengaging said drive while said foot is in engagement with a specimen.

References Cited in the file of this patent
UNITED STATES PATENTS

| | | |
|---|---|---|
| 2,100,332 | Hathaway et al. | Nov. 30, 1937 |
| 2,895,326 | Fesperman et al. | July 21, 1959 |